United States Patent [19]

Simeoni et al.

[11] Patent Number: 5,223,910

[45] Date of Patent: Jun. 29, 1993

[54] INTERFEROMETER DEVICES, ESPECIALLY FOR SCANNING TYPE MULTIPLEX FOURIER TRANSFORM SPECTROMETRY

[75] Inventors: Denis Simeoni, Cannes; Guy Cerutti-Maori, Cannes la Bocca, both of France

[73] Assignee: Aerospatiale Societe Nationale Industrielle, Paris, France

[21] Appl. No.: 531,353

[22] Filed: May 31, 1990

[30] Foreign Application Priority Data

Jun. 6, 1989 [FR] France .................. 89 07457

[51] Int. Cl.$^5$ ............................................. G01B 9/02
[52] U.S. Cl. ......................... 356/346; 356/351; 356/352
[58] Field of Search .................. 356/346, 351, 352

[56] References Cited

U.S. PATENT DOCUMENTS

| | | | |
|---|---|---|---|
| 3,684,379 | 8/1972 | Girard | 356/346 |
| 4,509,857 | 4/1985 | Vermande | 356/346 |
| 4,523,846 | 6/1985 | Breckinridge et al. | 356/346 |

FOREIGN PATENT DOCUMENTS

| | | |
|---|---|---|
| 0068922 | 1/1983 | European Pat. Off. . |
| 212727 | 12/1984 | Japan . |

OTHER PUBLICATIONS

Journal of the Optical Society of America–vol. 65; No. 2–Feb. 1975 Michaelson interferometer with frustrated-total internal reflection beamsplitter–Mark Daehler et al.

Proceedings of the SPIE, vol. 810, "Optical systems for space applications" 1987, pp. 117–124; P. Vermande et al.; Interferometric spectro-imager system (ISIS), pp. 117–118.

Applied Otics, vol. 24, No. 24, Dec. 15, 1985, p. 4403, New York, U.S.; T. Hidaka et al.; "Fourier transform infrared spectrometer".

Primary Examiner—Samuel A. Turner
Assistant Examiner—La Charles P. Keesee
Attorney, Agent, or Firm—Browdy and Neimark

[57] ABSTRACT

A two-channel multiplex Fourier transform spectrometry interferometer device comprises two semi-reflecting mirrors substantially in alignment with each other between two reflecting surfaces substantially parallel to each other and to a mean plane containing the semi-reflecting mirrors. At least one of the mirrors and surfaces is inclined by a non-zero amount to the mean plane. The algebraic sum of the inclinations of the semi-reflecting mirrors relative to the mean plane is different than the sum of the inclinations of the reflective surfaces relative to said plane. At least one prismatic blade means with an index of refraction different than that of the remainder of the interferometer device is disposed between one of the semi-reflecting mirror and one of the reflective surfaces. The algebraic differences of the prismatic blade angles are different to either side of the mean plane. For earth spectrometry the device is mounted on an aircraft or a satellite, for example, moving relative to the earth.

13 Claims, 3 Drawing Sheets

INTERFEROMETER DEVICES, ESPECIALLY FOR SCANNING TYPE MULTIPLEX FOURIER TRANSFORM SPECTROMETRY

BACKGROUND OF THE INVENTION

1. Field of the invention

The invention concerns an interferometer device adapted to be integrated into a multiplex Fourier transform spectrometry imaging system (or "spectroimager").

2. Description of the prior art

A spectro-imager is moved parallel to an objectarea to be scanned, an area of ground, for example.

The principle of multiplexed Fourier transform spectro-imaging is known in itself, in particular from the document EP-0.068.922 which teaches how to use the relative movement of the terrestrial surface and an aircraft or a satellite for obtaining, thanks to light interferences a spectral analysis of a set of contiguous elementary ground areas. This avoids any relative displacement of optical components of the interferometer device. The successive contents of an array or mosaic of CCD sensors on which the interference fringes are formed are used.

This document specifically describes an interferometer device in the form of a SAVART polariscope.

It has been found advantageous, in particular for reasons connected with the received light flux, to use a MICHELSON interferometer comprising a semi-reflecting mirror (beamsplitter) at 45° to the mutually orthogonal entry and exit beams. The semi-reflecting mirror splits the entry beam into two half-beams that are reflected back to the semi-reflecting mirror and between which a path difference is introduced: after the semi-reflecting mirror recombines part of each half-beam an exit beam is obtained with which an interferogram can be constructed. Because two half-beams are used the expression "two-wave interferometer" is sometimes used.

As described in U.S. Pat. No. 5,131,747 issued Jul. 21, 1992, to Cerutti-Maori and Simeoni attempts have been made to improve the spectro-imager system of the document EP-0.068.922 by using an appropriate two-wave type interferometer device. This work was specifically directed to:

providing two separate entry and exit channels;

increasing the usable energy gain, improving the contrast of the fringes and enhancing the radiometric resolution;

keeping the interferometer device and the spectro-imager as a whole as compact as possible and reducing its weight commensurately;

making the path difference independent of the aperture angle of the incident beam;

retaining the same inclinations for the mean rays of divergent waves; and superposing the geometrical images very precisely.

A MICHELSON type (and therefore two-wave) interferometer device suitable for use in a spectroimager of the type described in the document EP-0.068.922 was already known, in the form of the device described by GIRARD in the patent U.S. Pat. No. 3.684.379.

To overcome at least some of the inherent limitations of the GIRARD device the aforementioned patent U.S. Pat. No. 5,131,747 proposes a new interferometer device for multiplex Fourier transform spectrometry imaging designed to be moved relative to an entry optical system image in a direction constituting a reference direction for the interferometer device, comprising a prismatic block of transparent material having mutually perpendicular first and second entry/exit faces meeting at an edge of the block, a semi-reflecting mirror in the block arranged at 45° to the first and second entry/exit faces and passing through said edge of said block and first and second reflective surfaces respectively facing the first and second entry/exit faces through the semi-reflecting mirror; this new device was characterized in that:

there was associated with each entry/exit face a reference plane perpendicular to the entry/exit face and parallel to said reference direction, at least one inclined dioptric separation surface was provided between one of said entry/exit faces and the associated reflective surface, producing in the associated reference plane a non-zero diopter angle relative to the entry/exit face, the configuration and orientation of the first and second reflective surfaces were fixed relative to the block and each of these first and second reflective surfaces was a corner reflector with the concave side facing towards the associated entry/exit face with a bisecting plane parallel to said edge of the block perpendicular to said associated entry/exit face, the corner reflector surfaces having different angles of inclination in the reference planes and relative to the associated entry/exit faces.

In this way:

1—All of the energy concentrated by the entry objective lens system was usable.

2—Spurious reflections due to the optical surfaces encountered by the waves were relayed towards the entry paths and not on the exit paths; they did not affect the quality of the interference fringes.

3—The image formed by the entry objective lens system could be focused in any plane chosen by the user (who could also configure the interferometer for any position of the focal plane).

The present invention has the same objectives as the aforementioned U.S. Pat. No. 5,131,747 in the same field of application and with the same advantages but is additionally directed to improving the flexibility of use, to expanding the field of application and to further reducing the weight and volume on the equipment. Although the aforementioned U.S. Pat. No. 5,131,747 represented an undeniable advance it employed an objective lens system that was necessarily limited in terms of its numerical aperture and which additionally had to be adapted to passage through a large thickness of glass. Also, the corner reflector systems reversed the image formed by the objective lens system which necessitated rigorous straightness and alignment of the edges of the corner reflector system, which was extremely critical if the interferometer was to function correctly but very difficult to achieve.

The invention achieves the stated objective by discarding an improved MICHELSON type interferometer in favor of a totally different (McZENDER type) interferometer which those skilled in the art have until now tended to regard as having much less potential application than the MICHELSON interferometer, especially in spectro-imaging.

SUMMARY OF THE INVENTION

The invention consists in a two-channel multiplex Fourier transform spectrometry interferometer device comprising two semi-reflecting mirrors substantially in alignment with each other between two reflecting surfaces substantially parallel to each other and to a mean plane containing said semi-reflecting mirrors, wherein at least one of said mirrors and surfaces is inclined by a non-zero amount to said mean plane, the algebraic sum of the inclinations of the semi-reflecting mirrors relative to said mean plane being different than the sum of the inclinations of the reflective surfaces relative to said plane, and wherein at least one prismatic blade means with an index of refraction different than that of the remainder of the interferometer device is disposed between one of the semi-reflecting mirror and one of the reflective surfaces, the algebraic differences of the prismatic blade angles being different to either side of said mean plane.

According to preferred features of the invention, some of which may optionally be combined with each other:

the reflective surfaces are strictly parallel;

both the semi-reflecting mirrors are inclined in opposite directions to the mean plane;

the device is formed of two separator cubes having adjacent corner edges and the semi-reflecting mirrors of which constitute approximately diagonal planes and two prisms between these cubes having adjacent corners approximately at right angles, the reflective surfaces being formed on surfaces of these prisms opposite these corners;

said prismatic blade means is/are formed between the facing surfaces of the cubes and the prisms;

the device comprises a single blade means preferably situated within the angle formed by the semi-reflecting mirrors;

the device is made from glass and said prism blade means having a different refractive is an air gap or evacuated zone.

The invention also consists in a spectro-imaging system comprising a two-channel multiplex Fourier transform spectrometry interferometer device comprising two semi-reflecting mirrors substantially in alignment with each other between two reflecting surfaces substantially parallel to each other and to a mean plane containing said semi-reflecting mirrors, wherein at least one of said mirrors and surfaces is inclined by a non-zero amount to said mean plane, the algebraic sum of the inclinations of the semi-reflecting mirrors relative to said mean plane being different than the sum of the inclinations of the reflective surfaces relative to said plane, and wherein at least one prismatic blade means with an index of refraction different than that of the remainder of the interferometer device is disposed between one of the semi-reflecting mirror and one of the reflective surface, the algebraic differences of the prismatic blade angles being different to either side of said mean plane.

Objects, characteristics and advantages of the invention will emerge from the following description given by way of non-limiting example only with reference to the appended diagrammatic drawings.

DETAILED DESCRIPTION OF THE INVENTION

Figure 1:
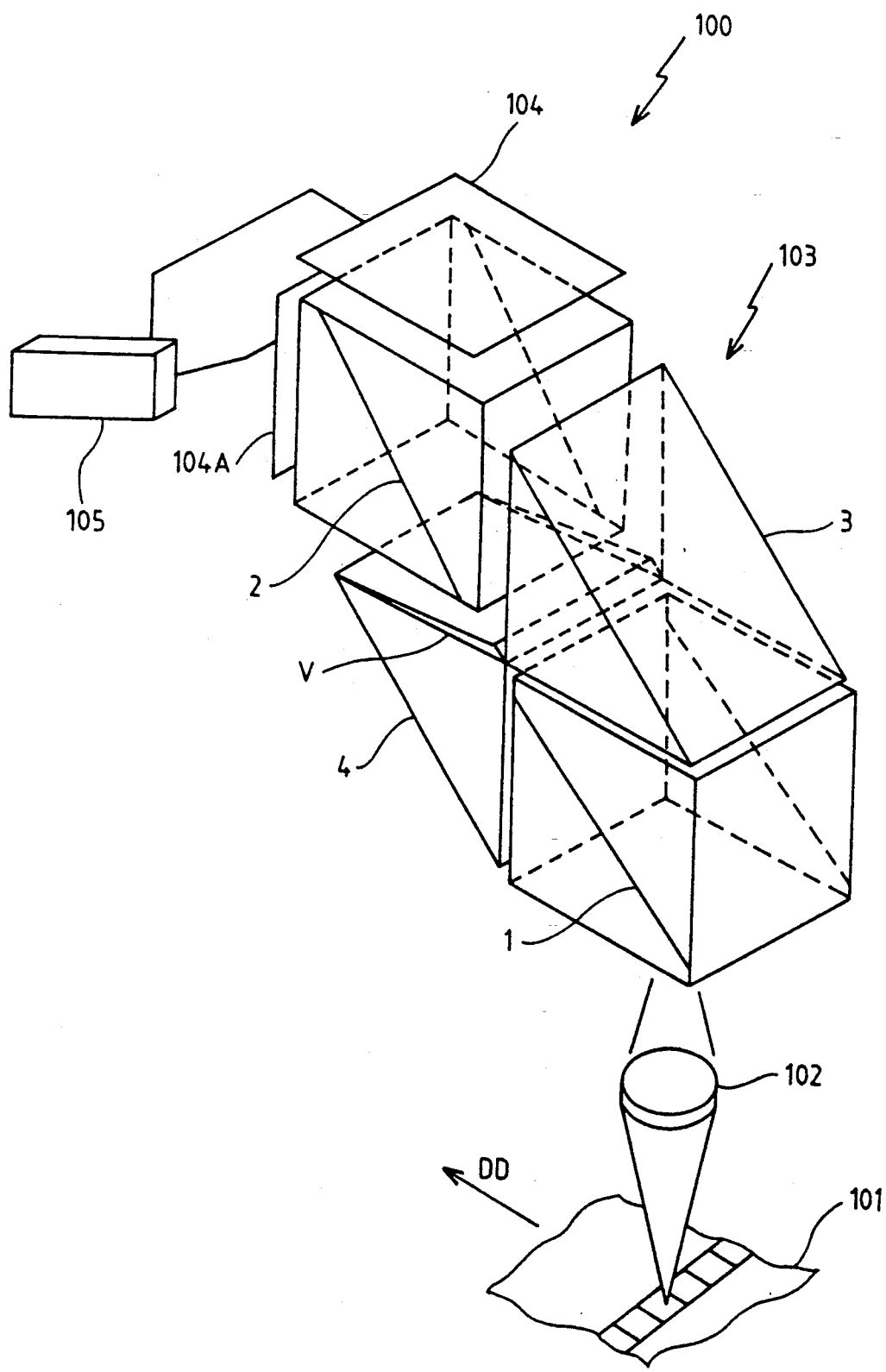
FIG. 1 is a schematic perspective view of a multiplex Fourier transform spectro-imaging system including an interferometer device in accordance with the invention.

The FIG. 1 multiplex Fourier transform spectroimaging system 100 is based on a similar general principle to that described in the previously mentioned U.S. Pat. No. 5,131,747.

It is adapted to be moved parallel to an area of ground 101 in a scanning direction here schematically represented by the arrow DD to form a spectrometer image of this ground area. The system is mounted on an aircraft or a satellite (not shown), for example.

It comprises an entry optical system 102, an interferometer device 103 with two entry and exit channels (to be described in detail below), at least one sensing device 104 (a second device 104A is shown here), in practise constituted by an array or mosaic of charge-coupled device (CCD) sensors, and a processing unit 105 of any appropriate known type adapted to form successive spectrometer images of the ground from the images formed on the sensing device(s), using a process known in itself and described in the aforementioned patent application in particular.

The interferometer device 103 with two entry and exit channels which constitutes the heart of the present invention is derived from the McZENDER interferometer. It essentially comprises two semi-reflecting mirrors 1 and 2 which are at least approximately coplanar and in alignment with each other. They are disposed between two plane reflecting surfaces 3 and 4 which are at least approximately parallel to each other and to the semi-reflecting mirrors. These reflecting surfaces are in practise approximately symmetrical with respect to the semi-reflecting mirrors.

In a McZENDER interferometer the semi-reflecting mirrors and the reflecting surfaces are strictly parallel, the semi-reflecting mirrors being exactly coplanar. As will be seen below, the invention is specifically directed to breaking away from this strict parallelism.

Taken as a whole, the mirrors and surfaces 1 through 4 are at approximately 45° to incident radiation with a mean ray R (or mean ray R', or even rays R and R').

Figure 2:
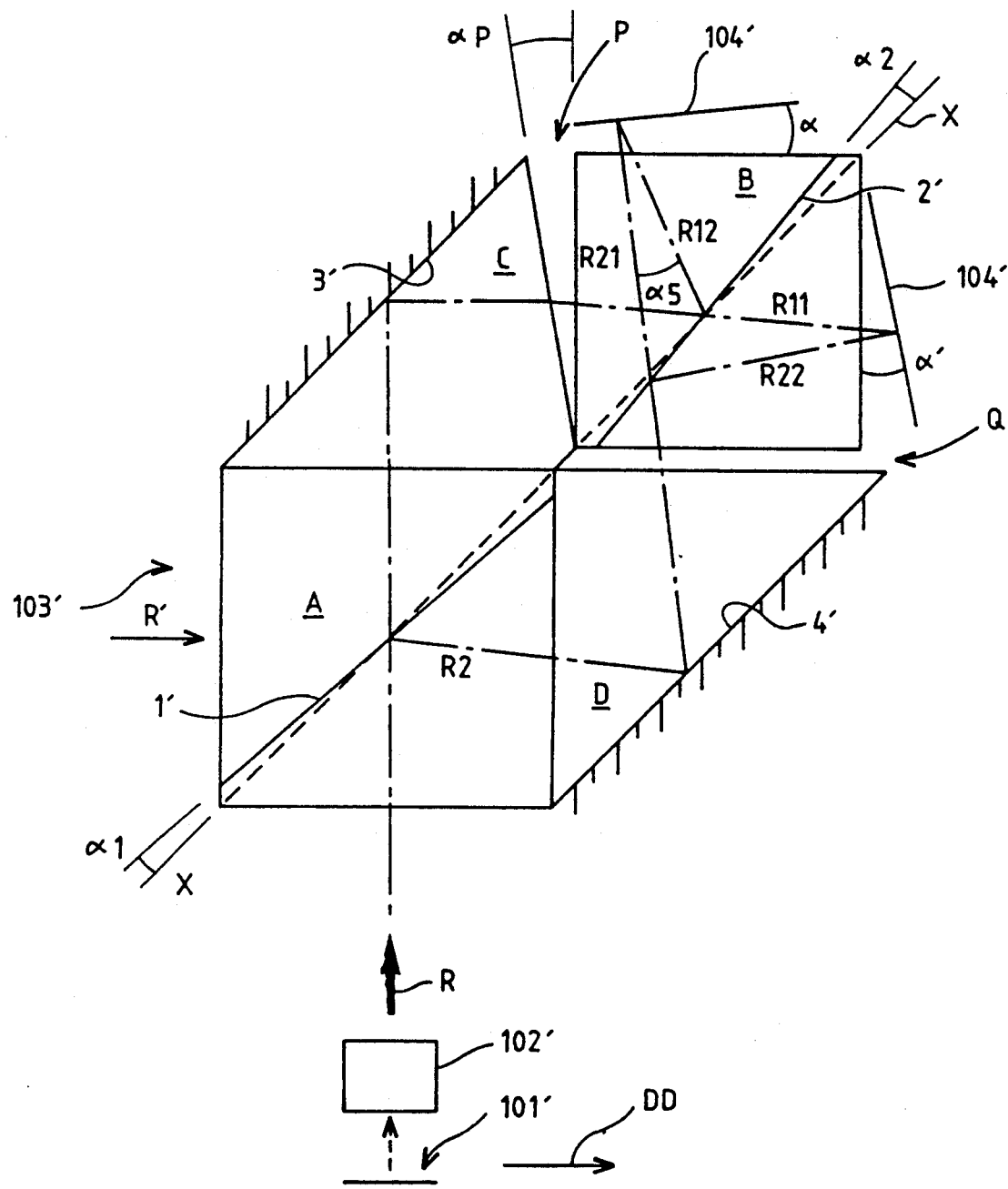
FIG. 2 is a schematic plan view of a different interferometer device.

As seen more clearly in FIG. 2 (where the reference numbers and letters are "primed"), the McZENDER interferometer device modified in accordance with the invention further comprises at least one prismatic blade or wedge P with angle $\alpha_p$ and a refractive index different than that of the remainder of the device, situated between one of the reflecting surfaces (3' in this case) and one of the semi-reflecting mirrors (2' in this case). In this instance the prismatic blade P is an air gap or evacuated zone.

In more precise terms, the interferometer device 103' is formed from four separate elements (in practise made from an appropriate known glass), namely an entry splitter cube A of which the semi-reflecting mirror 1' approximately constitutes a diagonal plane, an exit splitter cube B of which the second semi-reflecting mirror likewise approximately constitutes a diagonal plane and two reflector prisms C and D the largest surfaces of which extend along the reflecting surfaces 3' and 4' (the latter are, for example, obtained by depositing a reflective dielectric layer of an appropriate known type onto these surfaces). The cubes and prisms may be contiguous (as is the case here with the cube A and the prisms C and D) provided that, as previously mentioned, there remains (in this instance between B and C) a prismatic blade P with an angle $\alpha_p$, here constituted by air or vacuum (the gap Q between B and D has parallel faces). These elements are coupled to a support (behind the plane of FIG. 2, for example) which holds them in position. Alternatively the elements A, B, C may be cut from a single block.

The splitter cubes A and B may be formed of two approximately identical prisms contiguous at their base and separated by the semi-reflecting mirror in question, which is formed in any appropriate manner (thin film of (Al, Ag) dielectric followed by molecular adhesion bonding).

As schematically shown in FIG. 2 the ray R is split into two by the first semi-reflecting mirror 1' (or entry mirror): one "half-ray" $R_1$ passes through the mirror 1' and is reflected by the surface 3' while the other "half-ray" $R_2$ is reflected by the mirror 1' and then by the surface 4'. Each of these half-rays is then split into two: the half-ray $R_1$ is split into ray $R_{12}$ (reflected) and $R_{11}$ (transmitted) and the half-ray $R_2$ is split into ray $R_{21}$ (transmitted) and ray $R_{22}$ (reflected). The rays $R_{21}$ and $R_{12}$ recombine at the sensor 104' and the rays $R_{11}$ and $R_{22}$ recombine at the sensor 104A' (these sensors are located in the focal planes of the resulting two channels).

It will be understood that the different inclinations $\alpha_1$ and $\alpha_{p2}$ of the semi-reflecting mirrors relative to a mean plane X—X result in a path difference between the two rays arriving at each of the sensor systems while the prismatic wedge P with angle $\alpha_p$ provides for numerical aperture compensation. Appropriate choices for the angles $\alpha_1$, $\alpha_2$, $\alpha_p$ (and the angles $\alpha$ and $\alpha'$ between the sensors 104 and 104A and the exit faces of the output splitter cube)make it possible to superpose the images formed by the objective lens system in the focal planes whilst maintaining the correct numerical aperture compensation.

It may be noted that the angles $\alpha$ and $\alpha'$ correspond to the plane of optimum focusing of the images formed by the entry objective lens system. They are easy to calculate. Complying with them is not critical, however.

A more theoretical description of an interferometer in accordance with the invention will now be given with reference to FIG. 3 in which, without using "primed" reference symbols, a reference number has been given to the facing faces of the cubes and prisms. Thus the faces 5 and 6 of the cube A and the prism C face each other, the faces 7 and 8 of A and D face each other, the faces 9 and 10 of B and C face each other, and the faces 11 and 12 of B and D face each other. For example, the cubes and prisms A through D are right-angle cubes and prisms with an additional glass prismatic wedge V to form the slot or prismatic wedge P. Angles of inclination relative to the mean plane other than 45° would be feasible here, of course.

Figure 3:
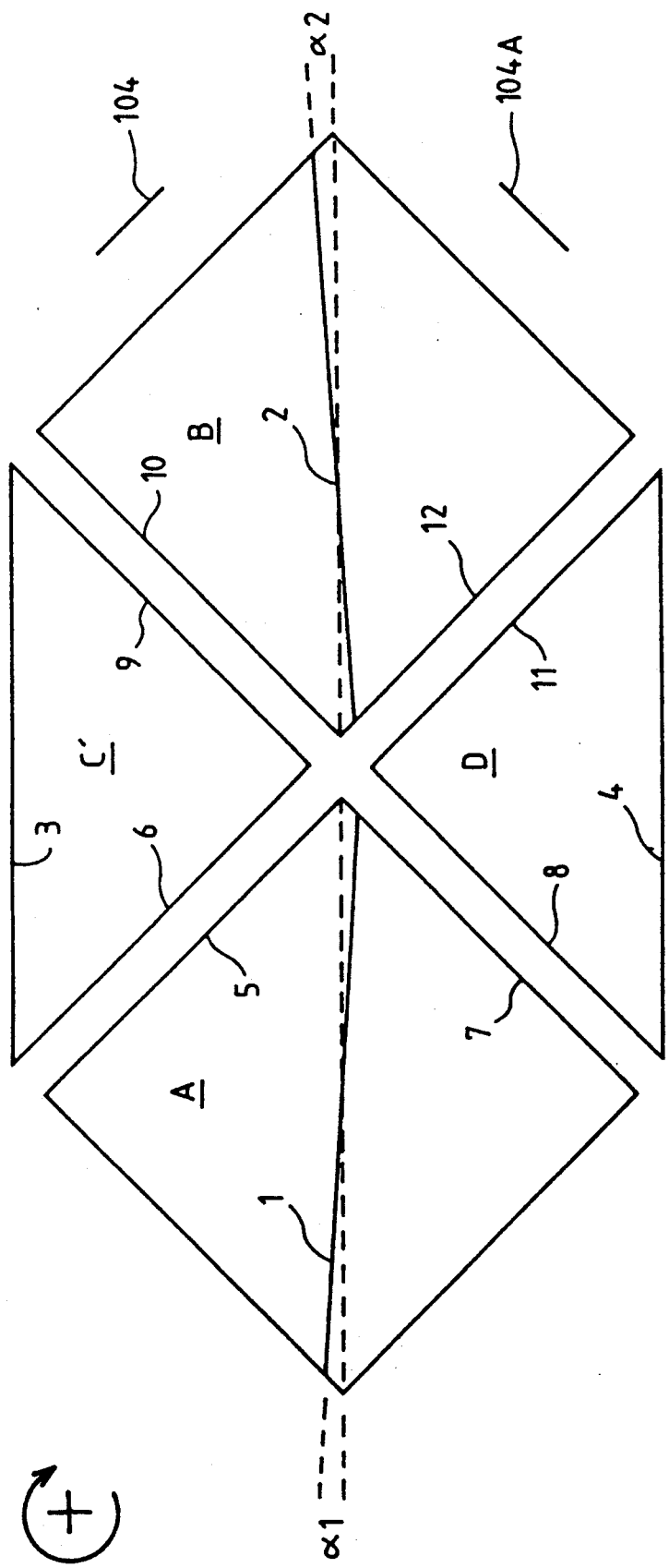
FIG. 3 is a theoretical diagram of an interferometer device of this kind.

Although not shown in FIG. 3, to make the latter more readable, $\alpha_3$ and $\alpha_4$ are the (possibly zero-valued) angles of inclination of the surfaces 3 and 4 relative to the plane X—X and $\alpha_5$ through $\alpha_{12}$ are the angles of inclination of the faces 5 through 12 relative to an orientation at 45° to X—X (all the angles are naturally measured with the same convention, clockwise, for example).

Ti denotes the path travelled by the mean ray between the face i (mirror or surface) and the focal planes(the sum of the paths in each material between this face and the focal planes, the path in each material being divided by the refractive index of the material: if n is the index of the glass used the overall focal length is therefore the sum: Ti(glass)/n +Ti(air.

Optimum performance is obtained if the following three requirements are satisfied:

1°—Path difference creation: if at the interferometer exit the mean rays of the beams of the two channels are at an angle o to each other, then this angle ensures the variation of the path difference between the two channels of the interferometer along the straight line formed by the intersection of the focal plane and the plane containing the two mean rays.

2°—Numerical aperture compensation: the numerical aperture compensation, or independence of the path difference vis a vis the angle of incidence of the ray of the beam in question, is obtained when the images formed by the two channels of the interferometer are focused in the same focal plane.

3°—Image superposition: the images are superposed when the mean rays of the beams of the two channels corresponding to the same image point intercept in the focal plane.

If $\alpha_S$ denotes the angle with which the two rays recombine in the focal plane (see FIG. 2), this first requirement is represented by the equation:

$$\alpha_S = 2n.(\alpha_1 + \alpha_2 - \alpha_3 - \alpha_4) - (n-1).(\alpha_5 - \alpha_6 + \alpha_7 - \alpha_8 + \alpha_{10} - \alpha_9 + \alpha_{12} - \alpha_{11})$$

The equation for good numerical aperture compensation is written:

$$\alpha_1 + \alpha_2 - \alpha_3 - \alpha_4 + (\alpha_5 - \alpha_6 + \alpha_7 - \alpha_8 + \alpha_{10} - \alpha_9 + \alpha_{12} - \alpha_{11})/2.(n-1) = 0$$

Note the angular offsets relative to X—X of the mirrors and surfaces 1 through 4 and the angle differences (air or vacuum) formed at the junction of the cubes and prisms A through D, of which, as already explained, at least one must be non-zero to form the prismatic wedge P.

The first term represents the difference of the cumulative inclinations of the semi-reflecting mirrors and the cumulative inclinations of the reflecting surfaces. This is a non-zero term.

The second term represents the difference between cumulative angles of the prismatic blades situated between A and C and B and D and cumulative angles of the prismatic blades situated between A and D and B and C. It also represents the difference between the prismatic blade angle differences on respective sides of the mean plane X—X.

In these equations the two cubes and the two prisms have symmetrical roles.

The mean rays of the two channels corresponding to the same image point intercept in the focal planes if:

$$\alpha_1 \cdot T_1 + \alpha_2 \cdot T_2 - \alpha_3 \cdot T_3 - \alpha_4 \cdot T_4 = [(n-1)/2n] \cdot$$
$$(\alpha_5 \cdot T_5 - \alpha_6 \cdot T_6 + \alpha_7 \cdot T_7 - \alpha_8 \cdot T_8 + \alpha_{10} \cdot T_{10} -$$

-continued $$\alpha_9 \cdot T_9 + \alpha_{12} \cdot T_{12} - \alpha_{11} \cdot T_{11})$$

By way of example (see also FIG. 2), to obtain $\alpha_S = 4.10^{-3}$ rad all the angles are zero except:

$$\alpha_1 = 0.72 \cdot 10^{-3} \text{ rad}$$
$$\alpha_2 = 1.54 \cdot 10^{-3} \text{ rad}$$
$$\alpha_3 = 3.54 \cdot 10^{-3} \text{ rad}$$

To give one example of the dimensions, the width of the cube A is 14 mm, that of the cube B is 12 mm and the thickness is 20 mm.

It has been assumed here that the three faces of the cubes A and B were strictly at 45° to X—X.

The angles $\alpha$ and $\alpha'$ are substantially equal to $-10^{-3}$ rad.

The McZENDER interferometer modified in this way retains the properties of the interferometer proposed in the aforementioned U.S. Pat. No. 5,131,747 while improving its performance; it has the following advantages:

Greater flexibility of use: in the interferometer proposed in the aforementioned patent U.S. Pat. No. 5,131,794 the corner reflector systems move the image formed by the objective lens symmetrically relative to the axis of the edge of the corner reflectors, so that the superposition of the images requires rigorous alignment of the edges of the corner reflector system, which is difficult to achieve and is highly critical in the functioning of the interferometer. The modified McZENDER type interferometer does not invert the image and the superposition of the images is controlled by simple self-collimating measures at the various optical surfaces and mirrors of the interferometer.

Increased field of application: the ray paths in the modified McZENDER type interferometer are reduced as compared with the interferometer proposed in the aforementioned patent No U.S. Pat. No. 5,131,747. The curve giving the permissible numerical aperture of the objective lens system as a function of the entry separator cube width is therefore significantly more favorable.

In a given application the interferometer can function in association with objective lens systems having smaller numerical apertures than when using the interferometer proposed in the aforementioned patent U.S. Pat. No. 5,131,747.

Reduced weight and volume: for comparable performance the modified McZENDER type interferometer has its weight and volume reduced by a factor of between 2 and 3 relative to the interferometer proposed in the aforementioned patent No. U.S. Pat. No. 5,131,747.

It goes without saying that the preceding description has been given by way of non-limiting example only and that numerous variations thereon may be proposed by those skilled in the art without departing from the scope of the invention.

There is claimed:

1. A two-channel multiplex Fourier transform spectrometry interferometer device comprising:
    a body having a first index of refraction including;
    two reflecting surfaces parallel to each other;
    two semi-reflecting mirrors substantially in the extension of each other and substantially contained in a mean plane between said two reflecting surfaces;
    each of said reflecting surfaces and semi-reflecting mirrors having a specific inclination angle with respect to said mean plane, with at least one of said inclination angles being non-zero and with the algebraic sum of said inclination angles of said semi-reflecting mirrors being different than the algebraic sum of said inclination angles of said reflecting surfaces;
    at least one prismatic blade means with a second index of refraction different than said first index of refraction, having a non-zero prismatic blade angle, and located between one of said semi-reflecting mirrors and one of said reflecting surfaces.

2. The device of claim 1, further comrpising a second prismatic blade means with said second index of refraction and located between said mean plane and the other of said reflecting surfaces and having a second prismatic blade angle different than said non-zero prismatic blade angle.

3. The device of claim 2, wherein said second prismatic blade angle is zero.

4. The device of claim 1 comrpising two first prismatic blade angles between a first of said reflecting surfaces and both said semi-reflecting mirrors and defining a first angle difference and two second prismatic blade angles between a second of said reflecting surfaces and both said semi-reflecting mirrors and defining a second angel difference different than said first angle different, one of said first and second prismatic blade angles being said non-zero prismatic blade angle.

5. The device of claim 4, wherein three of said first and second prismatic blade angles are zero.

6. The device of claim 4, wherein at least one of said prismatic blade angles and at least one of said second prismatic blade angles are zero and are determined by blade means of zero-thickness.

7. The device of claim 1, wherein said reflecting surfaces are strictly parallel to each other.

8. The device of claim 1, wherein said specific inclination angles of said semi-reflecting mirrors are of opposite means.

9. The device of claim 1, wherein said two semi-reflecting mirrors constitute diagonal planes of two respective separator cubes having adjacent corner edges and said two reflecting surfaces are formed on faces of two respective prisms having respective approximately right-angle corners opposite said faces, said prisms being located between said separator cubes on either side of said mean plane with said respective approximately right-angle corners of said prisms being substantially adjacent to each other.

10. The device of claim 9, wherein said at least one prismatic blade means is formed between facing faces of one of said cubes and one of said prisms.

11. The device of claim 1, wherein said at lest one prismatic blade means havinga non-zero prismatic blade angle is signal and wherein said semi-reflecting mirrors determine with each other a corner with an angle slightly less than 180° and containing said at least one prismatic blade means.

12. The device of claim 1, wherein said body is made from glass and said at least one prismatic blade means is an air or vacuum gap.

13. A multiplex Fourier transformer spectro-imaging system adapted to be moved relative to a ground area and comprising:
    a two-channel multiplex Fourier transformer spectrometry interferometer device comprising:
    a body having a first index of refraction including,
    two reflecting surfaces parallel to each other, two semi-reflecting mirrors substantially in the extension of each other and substantially contained in a mean plane between said two reflecting surfaces, each of said reflecting surfaces and semi-reflecting mirrors having a specific inclination angle with respect to said mean plane, with at least one of said inclination angles being non-zero and with the algebraic sum of said inclination angles of said semi-reflecting mirrors being different than the algebraic sum of said inclination angles of said reflecting surfaces, at least one prismatic blade means with a second index of refraction different than said first index of refraction, having a non-zero prismatic blade angle, and located between one of said semi-reflecting mirrors and one of said reflecting surfaces, an entry optical system located so as to transmit radiation from the ground area at 45° to one of said semi-reflecting mirrors, at least one sensing device at approximately 45° to the other of said semi-reflecting mirrors;

and a processing device connected to said sensing device.

* * * * *